(12) United States Patent  
Watarai et al.

(10) Patent No.: US 7,942,250 B2  
(45) Date of Patent: May 17, 2011

(54) BICYCLE HYDRAULIC BRAKE DEVICE

(75) Inventors: Etsuyoshi Watarai, Osaka (JP); Kenji Nakahara, Osaka (JP)

(73) Assignee: Shimano Inc., Osaka (JP)

( * ) Notice: Subject to any disclaimer, the term of this patent is extended or adjusted under 35 U.S.C. 154(b) by 1078 days.

(21) Appl. No.: 11/695,973

(22) Filed: Apr. 3, 2007

(65) Prior Publication Data

US 2008/0245632 A1   Oct. 9, 2008

(51) Int. Cl.  
*B62L 3/02* (2006.01)

(52) U.S. Cl. .................. 188/344; 188/24.11; 188/26

(58) Field of Classification Search ............... 188/344, 188/24.11, 26  
See application file for complete search history.

(56) References Cited

U.S. PATENT DOCUMENTS

| 6,804,961 | B2 | 10/2004 | Lampkin |
| 6,957,534 | B2 | 10/2005 | Lampkin |
| 2003/0121736 | A1 | 7/2003 | Lampkin |
| 2003/0121739 | A1 | 7/2003 | Lampkin |
| 2004/0055840 | A1 | 3/2004 | Lampkin |
| 2005/0061590 | A1 | 3/2005 | Lampkin |
| 2005/0199450 | A1 | 9/2005 | Campbell et al. |
| 2007/0051575 | A1 | 3/2007 | Lampkin |

FOREIGN PATENT DOCUMENTS

| CN | 1930038 A | 3/2007 |
| DE | 200 18 705 U1 | 2/2001 |
| EP | 1 160 152 A1 | 12/2001 |

*Primary Examiner* — Bradley T King  
(74) *Attorney, Agent, or Firm* — Global IP Counselors, LLP

(57) ABSTRACT

A bicycle hydraulic brake device includes a housing having a master cylinder, a master piston movably mounted in the master cylinder, a brake operating member and an adjustment mechanism. The brake operating member is arranged to move between a rest position and a brake actuating position and to move the master piston in response to movement of the brake operating member to the brake actuating position. The adjustment mechanism is arranged to adjust the rest position and a free stroke of the brake operating member with an initial travel position of the master piston remaining unchanged. The adjustment mechanism includes a first adjustment member that adjusts a length of a free stroke and a second adjustment member that adjusts the rest position of brake operating member without changing the length of the free stroke.

24 Claims, 13 Drawing Sheets

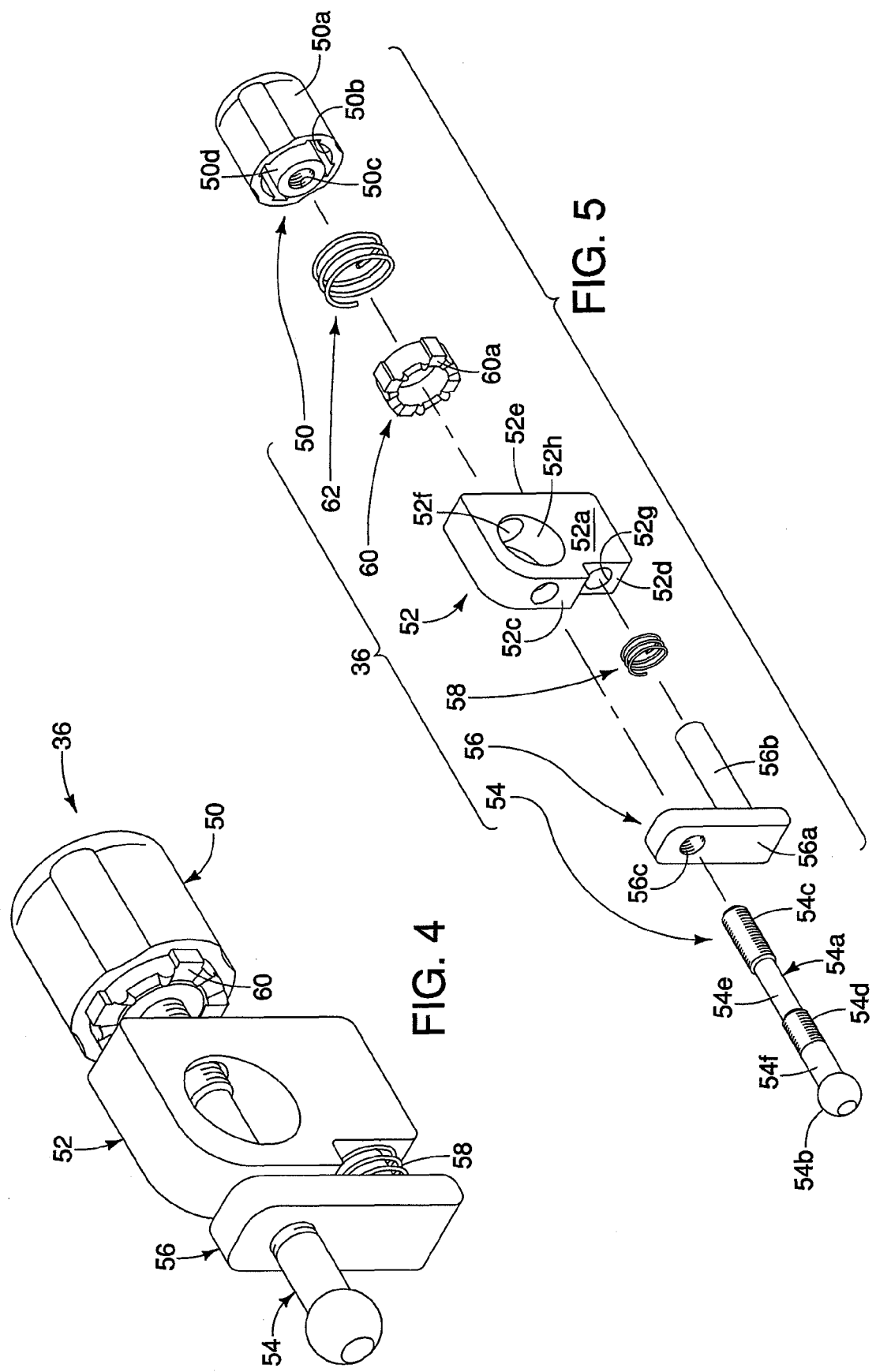

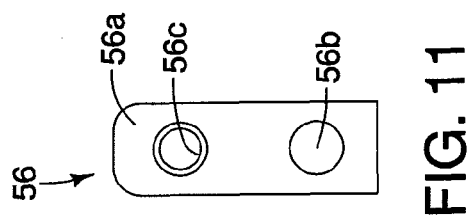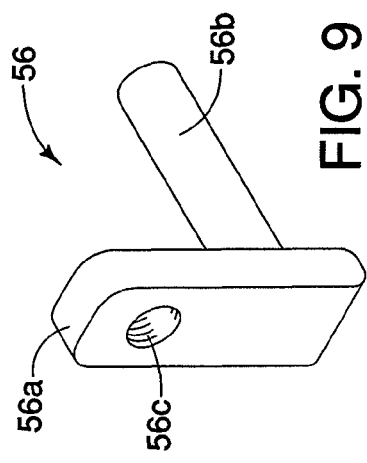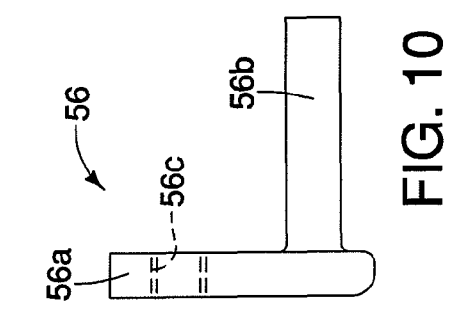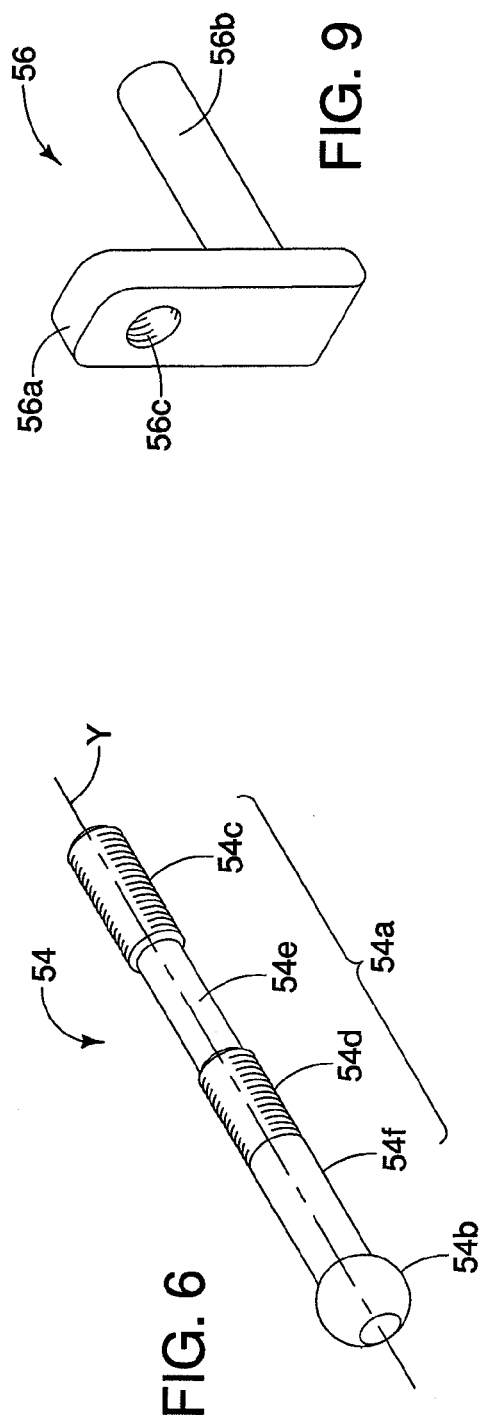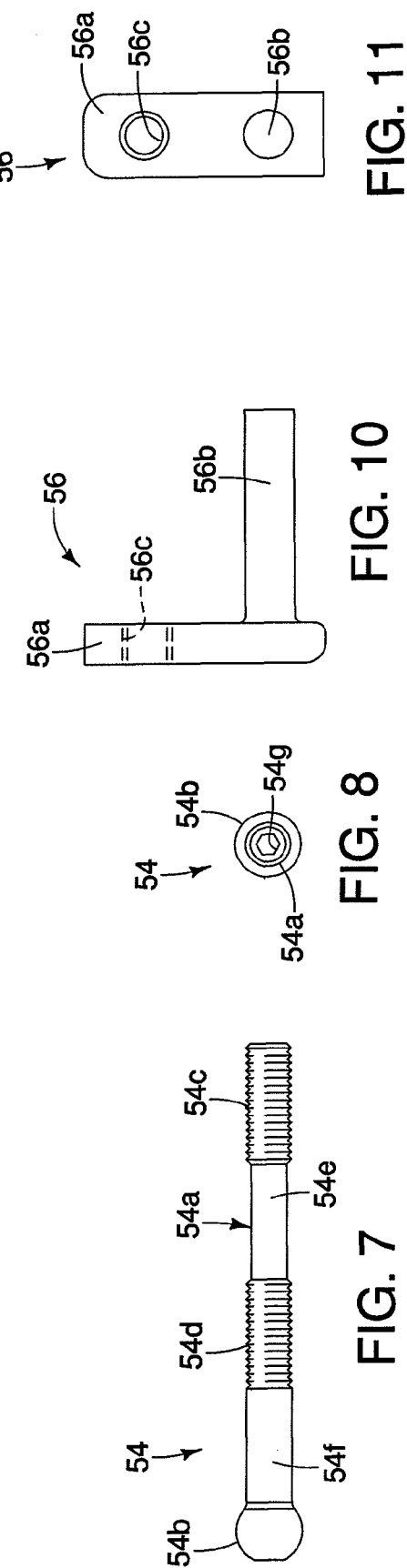

BICYCLE HYDRAULIC BRAKE DEVICE

BACKGROUND OF THE INVENTION

1. Field of the Invention

This invention generally relates to bicycle hydraulic brake device. More specifically, the present invention relates to bicycle hydraulic brake (actuation) device that includes an adjustment mechanism for adjusting a free stroke of an operating member and for adjusting a rest position of the operating member.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. Specifically, bicycle braking systems have been extensively redesigned.

In recent years, bicycles have been provided with hydraulic braking systems. A hydraulic brake system typically includes a hydraulic brake actuation device, a rotor attached to one of the bicycle wheels and a brake caliper having a slot that receives the rotor therein. The caliper has brake pads that selectively contact the rotor in response to changes in hydraulic pressure in the hydraulic brake actuation device when an actuator such as a lever is moved. Bicycle typically include a front braking system to apply a braking force to the front wheel and a rear braking system to apply a braking force to the rear wheel.

A hydraulic brake actuation device typically has a housing mounted to the bicycle handlebar. The housing includes a master cylinder, a master piston disposed in the master cylinder and a brake lever pivotally supported on the housing. Pivoting movement of the brake lever provides leverage for moving the master piston in the master cylinder, which in turn causes movement of one or more slave pistons in the caliper. Typically, the brake pads are spaced apart from braking surfaces of the rotor until moved into braking contact with the rotor by movement of the slave piston(s).

Typically, when the brake lever of the hydraulic brake actuation device is moved, the slave cylinder(s) also move a corresponding amount. Such an arrangement can result in a strong braking force relatively early in the range of movement of the brake lever. Such a braking action can feel unnatural as compared to using cable actuated rim brakes. Moreover, with this arrangement, a higher than desired braking force may be applied (i.e., the brake action may slow the rider more quickly than desired). Accordingly, some hydraulic braking systems have been provided which have a free stroke. A free stroke is a range of movement of the brake lever during which the slave cylinder(s) do not move. While these braking systems utilizing a free stroke generally work well, the amount of free stroke is not always optimum for all riders or riding conditions. Additionally, typical hydraulic brake actuation devices utilize a set rest or start position for the brake lever. Unfortunately, the set rest or start position of typical hydraulic brake actuation devices is not always optimum for all riders or riding conditions.

Accordingly, more recently, some hydraulic brake systems have been provided that have an adjustable free stroke and/or rest position. While these adjustable systems generally work well, these adjustable systems have disadvantages. Specifically, the typical adjustable systems can be relatively complicated (e.g., utilize numerous parts) and/or expensive to manufacture and/or assemble. Moreover, with these adjustable systems, it can be relatively cumbersome to adjust the free stroke and/or the rest position. Furthermore, with these typical adjustable hydraulic brake systems, it can be difficult and/or even impossible to adjust the free stroke or rest position without also adjusting the other.

In view of the above, it will be apparent to those skilled in the art from this disclosure that there exists a need for an improved hydraulic brake (actuation) device. This invention addresses this need in the art as well as other needs, which will become apparent to those skilled in the art from this disclosure.

SUMMARY OF THE INVENTION

One object of the present invention is to provide a bicycle hydraulic brake (actuation) device, which provides a smooth, natural feeling braking action.

Another object of the present invention is to provide a bicycle hydraulic brake device, which provides an efficient, reliable stopping force.

Another object of the present invention is to provide a bicycle hydraulic brake device, which has an adjustment mechanism for adjusting free stroke and brake lever rest position independently of each other in a simple manner.

Yet another object of the present invention is to provide a hydraulic brake device, which is relatively simple and inexpensive to manufacture and/or assemble.

The foregoing objects can basically be attained by providing a bicycle hydraulic brake device, which includes a housing having a master cylinder, a master piston movably mounted in the master cylinder, a brake operating member and an adjustment mechanism. The brake operating member is movably coupled relative to the housing to move between a rest position and a brake actuating position and to move the master piston in the master cylinder in response to movement of the brake operating member to the brake actuating position. The adjustment mechanism is operatively coupled between the brake operating member and the master piston to adjust the rest position and a free stroke of the brake operating member with an initial travel position of the master piston remaining unchanged. The adjustment mechanism includes a first adjustment member that adjusts a length of a free stroke and a second adjustment member that adjusts the rest position of brake operating member without changing the length of the free stroke.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 4 is an enlarged, perspective view of parts of the adjustment mechanism of the hydraulic brake device illustrated in FIG. 3;

FIG. 5 is an exploded, perspective view of parts of the adjustment mechanism of the hydraulic brake device illustrated in FIG. 3;

FIG. 6 is an enlarged, perspective view of the push rod of the adjustment mechanism illustrated in FIG. 5;

FIG. 7 is a longitudinal elevational view of the push rod illustrated in FIG. 6;

FIG. 8 is an end elevational view of the push rod illustrated in FIGS. 6 and 7;

FIG. 9 is an enlarged, perspective view of the adjustment part of the adjustment mechanism illustrated in FIG. 5;

FIG. 10 is a longitudinal elevational view of the adjustment part illustrated in FIG. 9;

FIG. 11 is an end elevational view of the adjustment part illustrated in FIGS. 9 and 10;

DETAILED DESCRIPTION OF THE PREFERRED EMBODIMENTS

A selected embodiment of the present invention will now be explained with reference to the drawings. It will be apparent to those skilled in the art from this disclosure that the following descriptions of the embodiment of the present invention are provided for illustration only and not for the purpose of limiting the invention as defined by the appended claims and their equivalents.

Figure 1:
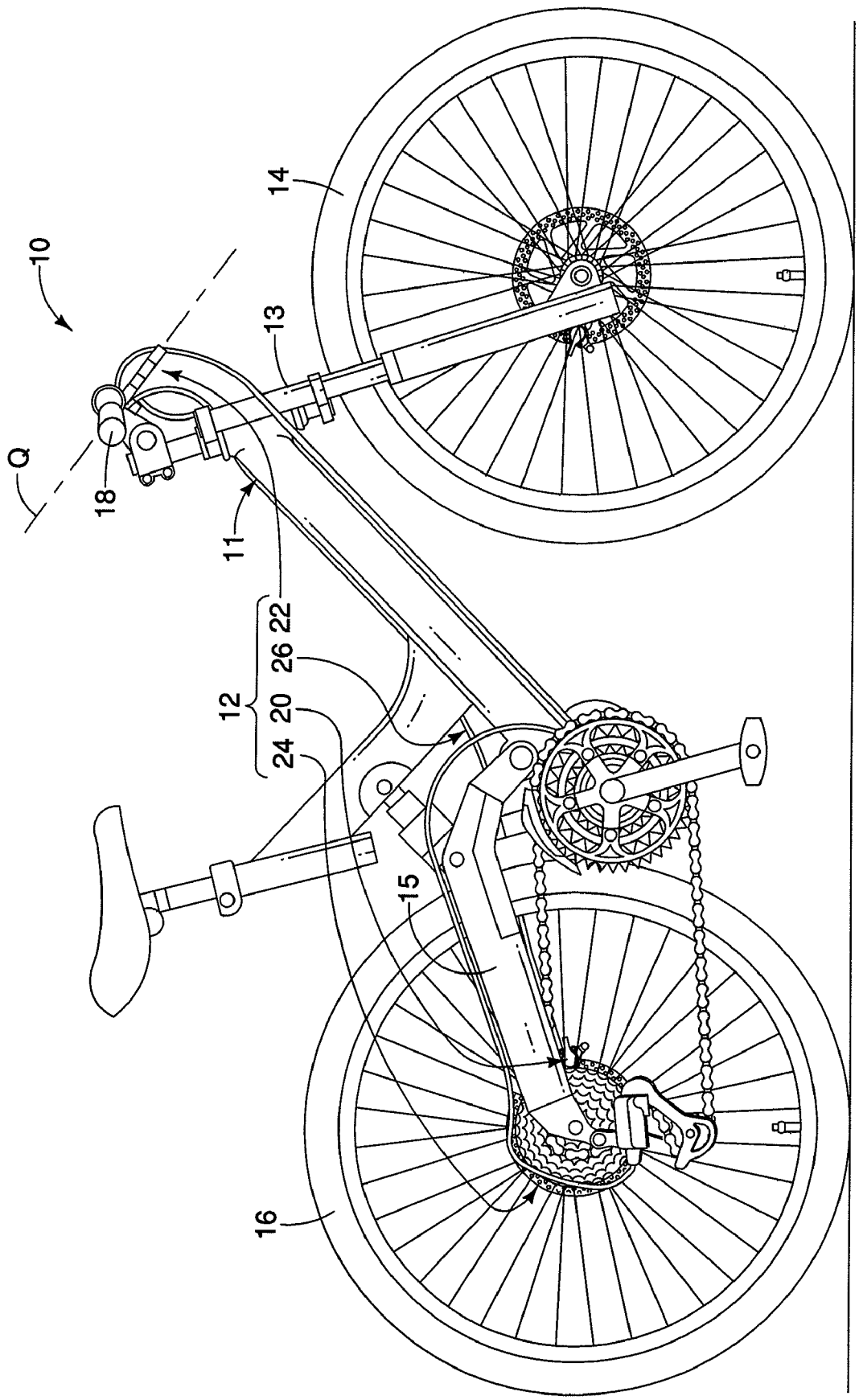
FIG. 1 is a side view of a bicycle equipped with a bicycle hydraulic brake system in accordance with the present invention.
Figure 2:
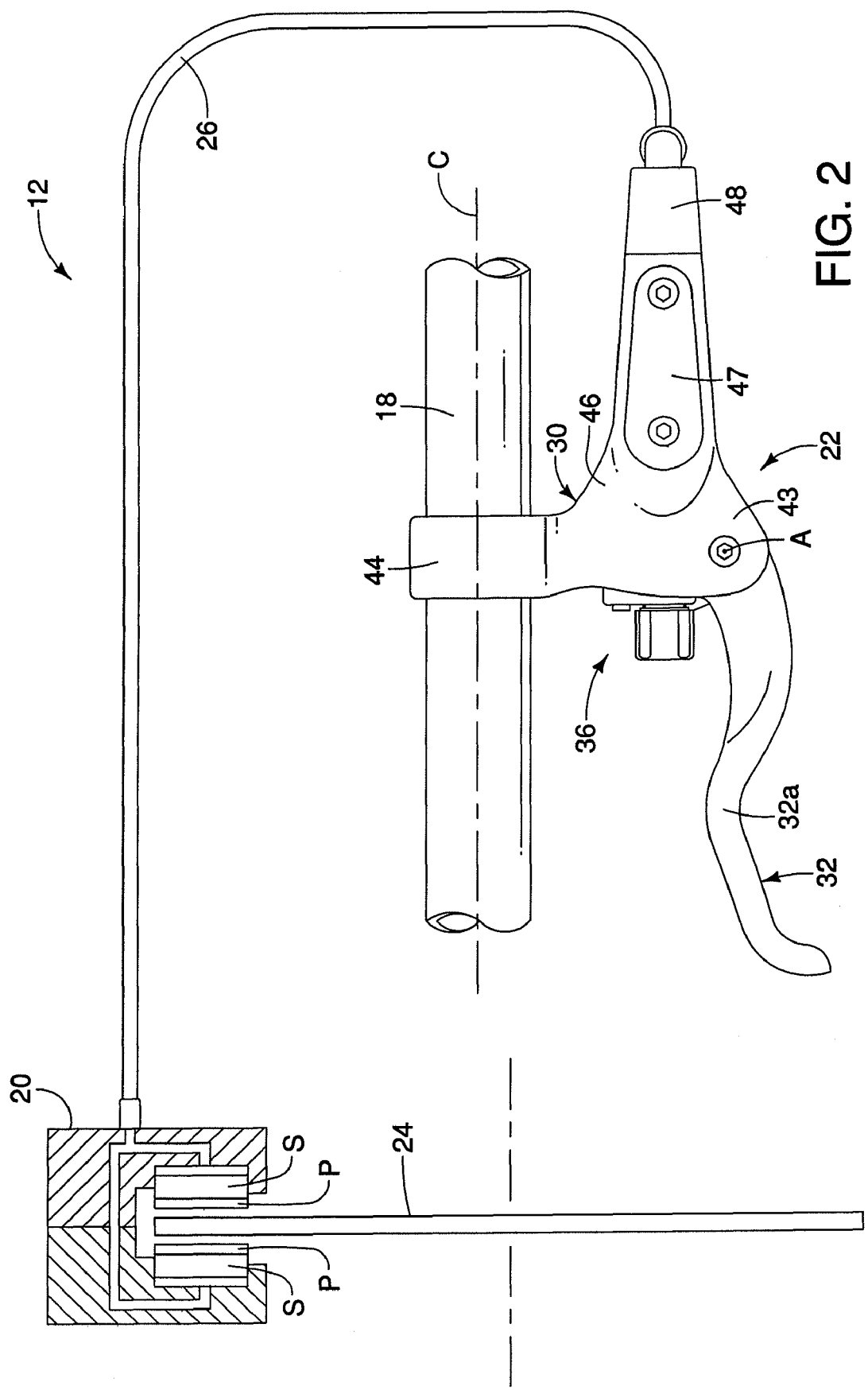
FIG. 2 is a schematic view of the hydraulic brake system illustrated in FIG. 1, showing the hydraulic brake (actuation) device operably connected to a brake caliper in accordance with the present invention.

Referring initially to FIGS. 1-2, a bicycle 10 equipped with a bicycle hydraulic braking system 12 is illustrated in accordance with the present invention. The hydraulic braking system 12 is arranged and configured to adjust free stroke and rest position independently of each other in accordance with the present invention, as explained below. The bicycle 10 includes a frame 11 with front and rear forks 13 and 15, a front wheel 14 rotatably coupled to the front fork 13, a rear wheel 16 rotatably coupled to the rear fork 15 and a handlebar 18. The front fork 13 is pivotally supported on the frame 11. The handlebar 18 is attached to the front fork 13 to steer the bicycle 10 using the front wheel 14 in a conventional manner.

The bicycle 10 is conventional, except for the hydraulic braking system 12. Accordingly, the bicycle 10 will not be explained and/or illustrated in detail herein, except as related to the hydraulic braking system 12. In other words, it will be apparent to those skilled in the bicycle art that the bicycle 10 preferably includes various other conventional bicycle components such as a seat, a drive train with pedals and a chain, front and rear derailleurs, front and rear shifters, etc. Moreover, it will be apparent to those skilled in the bicycle art from this disclosure that various modifications can be made to the bicycle 10 and its components without departing from the scope of the present invention.

The hydraulic braking system 12 illustrated herein is utilized for applying a braking force to the rear wheel 16. However, it will be apparent to those skilled in the bicycle art from this disclosure that the bicycle 10 includes a separate braking system for applying a braking force to the front wheel 14. Since the front and rear bicycle brake systems have the same components and operate in the same manner, only the hydraulic brake system 12 is described herein for the sake of brevity. Specifically, the descriptions and illustrations herein of the hydraulic braking system 12 apply to both front and rear braking systems, except some parts of the front braking system are mirror images of the rear braking system 12.

The hydraulic braking system 12 basically includes a bicycle brake caliper 20, a bicycle hydraulic brake (actuation) device 22, a bicycle brake rotor 24 and a hydraulic line (conduit) 26 fluidly connected between the brake caliper 20 and the hydraulic brake device 22. The brake caliper 20 is preferably non-movably attached to the rear fork 15 in a conventional manner. The brake caliper is partially hidden in FIG. 1 due to its location on the left side of the bicycle 10. The hydraulic brake device 22 is attached to the handlebar 18 with the hydraulic line 26 extending along the frame 11 between the caliper 20 and the hydraulic brake device 22. The rotor 24 is attached to the rear wheel 16 to rotate therewith in a conventional manner.

The brake caliper 20 basically includes at least one (a pair illustrated) slave piston S and a pair of brake pads P that are spaced apart from each other to form a rotor receiving slot therebetween. The hydraulic brake device 22 is the master of the slave cylinders S of the brake caliper 20. In other words, the hydraulic brake device 22 controls movement of the slave pistons S by selectively increasing/decreasing fluid pressure within the hydraulic channel/chamber between the hydraulic brake device 22 and the brake caliper 20, thereby controlling movement of the brake pads P relative to the brake rotor 24 to apply/remove a braking force. The hydraulic braking system 12 is conventional, except for the hydraulic brake (actuation) device 22. Accordingly, the hydraulic braking system 12 will not be explained and/or illustrated in detail herein, except as related to the hydraulic brake (actuation) device 22.

Figure 3:
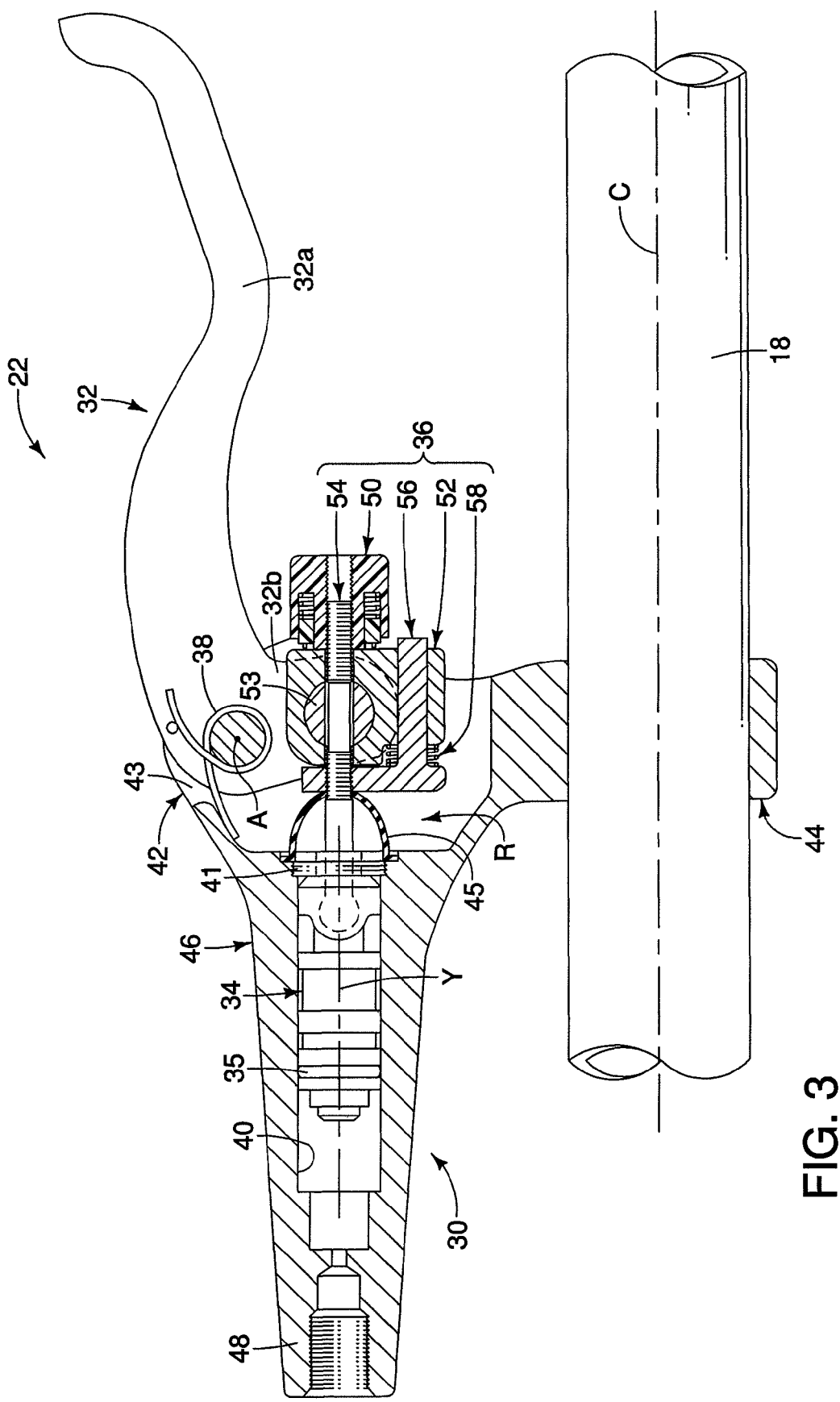
FIG. 3 is an enlarged, top plan view of the hydraulic brake (actuation) device of the hydraulic brake system illustrated in FIG. 2, with portions broken away for the purpose of illustration.
Figure 15:
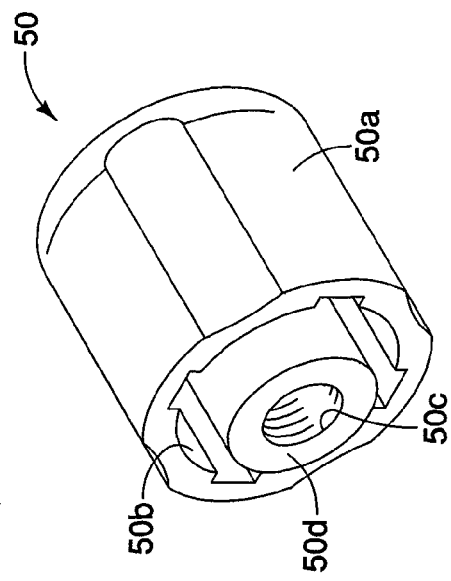
FIG. 15 is an enlarged, perspective view of the knob of the adjustment mechanism illustrated in FIG. 5.
Figure 17:
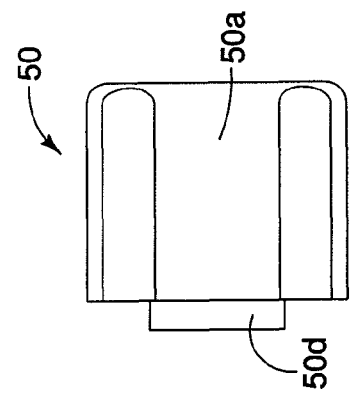
FIG. 17 is a longitudinal elevational view of the knob illustrated in FIGS. 15 and 16.
Figure 16:
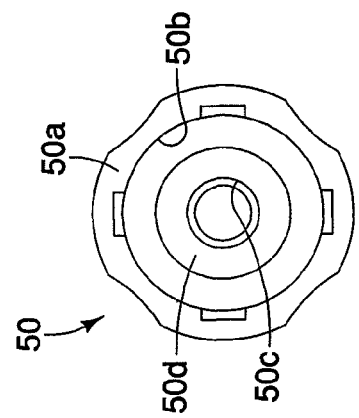
FIG. 16 is an end elevational view of the knob illustrated in FIG. 15.
Figure 12:
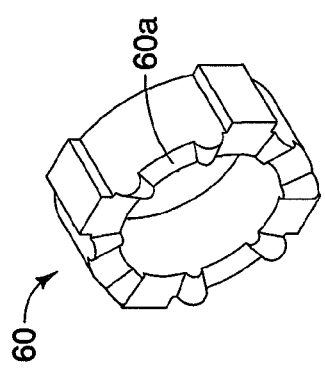
FIG. 12 is an enlarged, perspective view of the indexing ring of the adjustment mechanism illustrated in FIG. 5.
Figure 14:
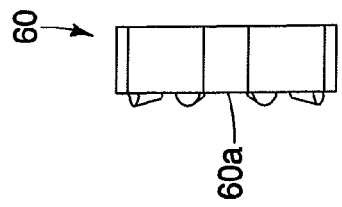
FIG. 14 is a longitudinal elevational view of the indexing ring illustrated in FIGS. 12 and 13.
Figure 13:
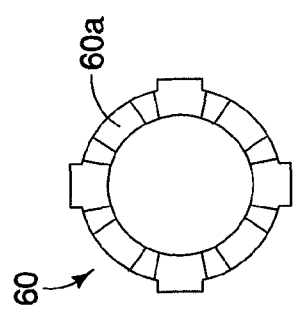
FIG. 13 is an end elevational view of the indexing ring illustrated in FIG. 12.
Figure 19:
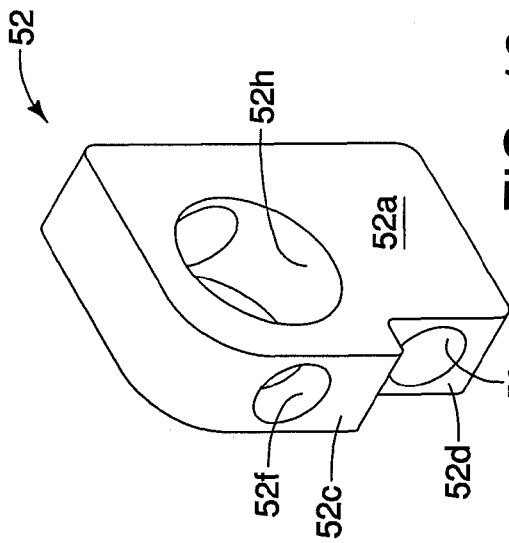
FIG. 19 is a reverse, perspective view of the base part illustrated in FIG. 18.
Figure 18:
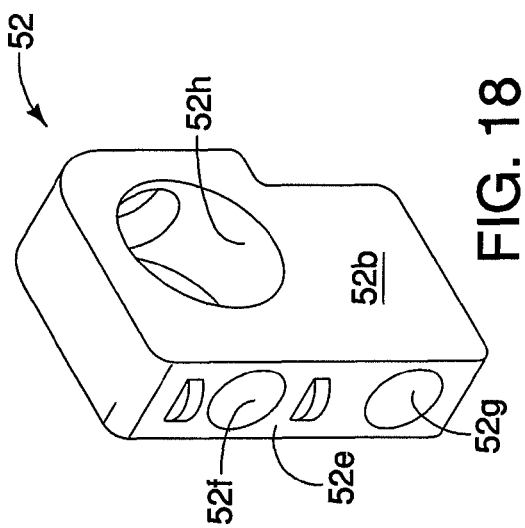
FIG. 18 is an enlarged, perspective view of the base part of the adjustment mechanism illustrated in FIG. 5.
Figure 22:
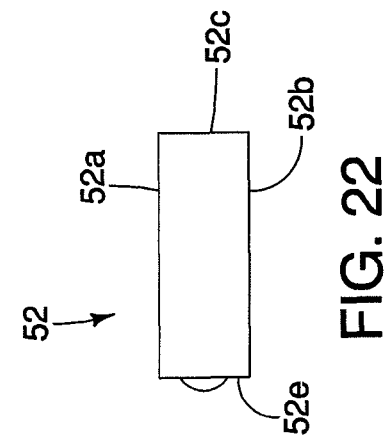
FIG. 22 is a top plan view of the base part illustrated in FIGS. 18-21.
Figure 21:
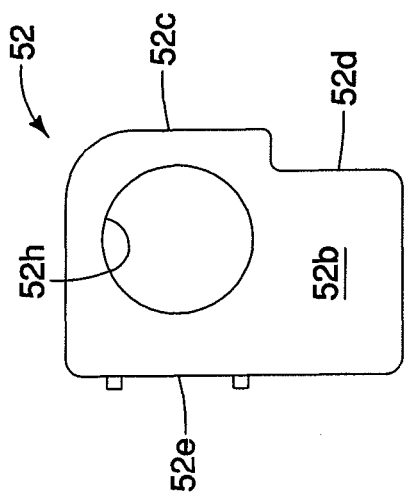
FIG. 21 is a longitudinal elevational view of the base part illustrated in FIGS. 18-20.
Figure 20:
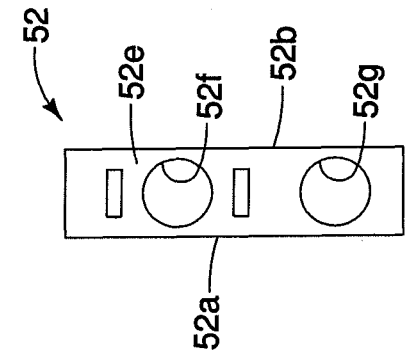
FIG. 20 is an end elevational view of the base part illustrated in FIGS. 18 and 19.
Figure 23:
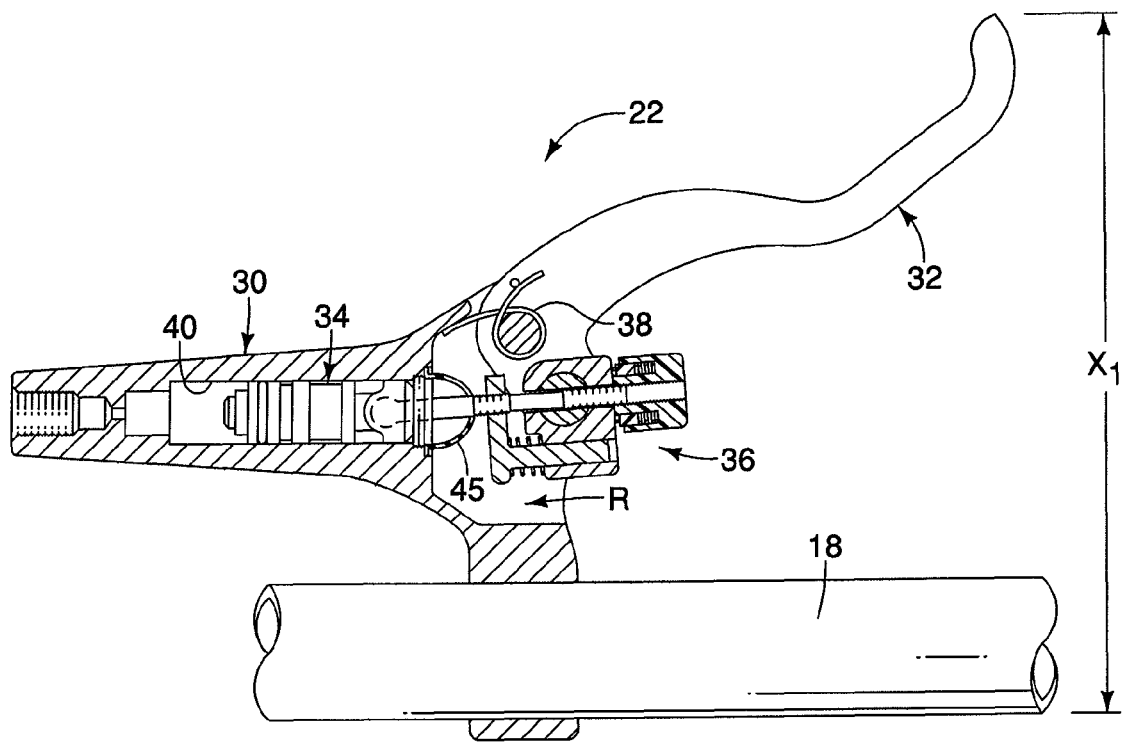
FIG. 23 is a top plan view of the hydraulic brake (actuation) device illustrated in FIGS. 1-3, with portions broken away for the purpose of illustration, with the brake operating member in a first (maximum) rest position set by the adjustment mechanism, with the master piston in an initial travel position and with the adjustment mechanism set to allow a first (maximum) free stroke.

Referring now to FIGS. 2-5, the hydraulic brake device 22 basically includes a housing 30, a brake operating member 32, a master piston 34, an adjustment mechanism 36 and a biasing member 38. The housing 30 is attached to the handlebar 18. The housing 30 has a master cylinder 40 with the master piston 34 slidably received therein. The brake operating member 32 is movably coupled to the housing 30 to move between an adjustable rest position and a brake actuating position to move the master piston 34 in the master cylinder. The brake operating member 32 is preferably pivotally attached to the housing 30 to move along a braking plane Q perpendicular to a main pivot axis A of the brake operating member 32. The adjustment mechanism 36 is operatively coupled between the brake operating member 32 and the master piston 34. The biasing member 38 is preferably a coiled torsion spring disposed about the pivot axis A, which biases the brake operating member 32 toward the rest position (i.e., counterclockwise as shown in FIG. 3).

The brake operating member 32 moves from a rest position to a brake actuating position to move the master piston 34 in the master cylinder 40 from an initial travel position to a braking travel position in response to movement of the brake operating member 32 to the brake actuating position. The brake operating member 32 begins to move the master piston 34 after moving through a free stroke in which the master piston does not move in response to movement of the brake operating member 32 from the rest position. The adjustment mechanism 36 is operatively coupled between the brake operating member 32 and the master piston 34 to adjust the rest position and the free stroke of the brake operating member 32. Preferably, the initial travel position of the master piston remains unchanged (i.e., is fixed) regardless of the rest position and free stroke of the brake operating member 32.

The housing 30 basically includes a lever support portion 42, a tubular clamping portion 44, a main support portion 46 and a hydraulic line/hose attachment portion 48. The master cylinder 40 is formed in the main support portion 46. Preferably, the lever support portion 42, the tubular clamping portion 44, the main support portion 46 and the hydraulic line/hose attachment portion 48 are all constructed of lightweight, rigid materials such as metallic materials that are well known in the bicycle art, and are rigidly attached together. In the illustrated embodiment, the lever support portion 42, the tubular clamping portion 44, the main support portion 46 and the hydraulic line/hose attachment portion 48 are preferably integrally formed together as a one-piece, unitary member using conventional manufacturing techniques such as casting and/or machining.

The lever support portion 42 has a pair of parallel, spaced mounting plates 43 that form a recess R for receiving part of the brake operating member 32 and part(s) of the adjustment mechanism 36 therein between the mounting plates 43. The tubular clamping portion 44 has a C-shaped configuration with a curved surface extending between two free ends that are attached together using a fastener (not shown) to clamp the clamping portion 44 onto the handlebar 18 in a conventional manner, as best understood from FIGS. 2 and 3. The hydraulic line/hose attachment portion 48 has a threaded bore in fluid communication with the master cylinder 40. The hydraulic line 26 is attached in the threaded bore of the hydraulic line/hose attachment portion 48 such that the hydraulic line 26 is in fluid communication with the master cylinder 40.

The main support portion 46 preferably has a hydraulic fluid reservoir (not shown) in fluid communication with the master cylinder 40 in a conventional manner. A removable cover 47 preferably covers the hydraulic fluid reservoir in a conventional manner, as shown in FIG. 2. The master cylinder 40 extends from the recess R into the main support portion 46. The master cylinder 40 includes a stepped, threaded section that receives a mating threaded retaining member 41 therein to form a stop for the master piston 34 in the initial travel position, and to retain the master piston 34 in the master cylinder 40 within the main support portion 46.

Referring still to FIGS. 3-5, the brake operating member 32 includes a lever portion 32a extending outwardly from the housing 30 and an actuating portion 32b non-movably attached to the lever portion 32a in an L-shaped configuration. In the illustrated embodiment, the lever portion 32a and the actuating portion 32b are preferably integrally formed together as a one-piece, unitary member from a lightweight, rigid material such as a metallic or plastic material. The lever portion 32a is designed to be moved by a rider's fingers so as to pivot the lever portion 32a and the actuating portion 32b about the pivot axis A. The actuating portion 32b is operatively coupled to the adjustment mechanism 36 to move a part of the adjustment mechanism 36, as explained below. The lever portion 32a extends in a direction generally parallel to the handlebar 18 when the hydraulic brake device 22 is attached to the handlebar 18.

The master piston 34 is basically a step-shaped cylindrical member sized to be slidably received in the master cylinder 40. An O-ring (sealing ring) 35 is received in a recess of the master piston 34 co create an annular seal within the master cylinder 40 around the master piston 34. A cone shaped resilient sealing member 45 is attached to the housing 30 within the recess R using the retaining member 41 to seal the free end of the master cylinder 40 in a conventional manner. The sealing member 45 has a central hole at the apex of cone shaped portion that seals around a part of the adjustment mechanism 36.

Referring now to FIGS. 3-22, the adjustment mechanism 36 basically includes a knob 50, a base part 52, a push rod 54, an adjustment part 56, a biasing part 58, an indexing ring 60 and an indexing biasing element 62. The knob 50 is threadedly mounted on a free end of the push rod 54. The base part 52 is slidably mounted on the push rod 54 adjacent the knob 50. The base part 52 is attached to the actuating part 32b of the brake operating member 32 to move when the brake operating member 32 is moved about the pivot axis A. The push rod 54 is freely rotatably coupled to the master piston 34. The push rod 54 is axially non-movable relative to the master piston 34. In other words, the master piston 34 moves axially with the push rod 54. The adjustment part 56 is threadedly mounted on the push rod 54 between the base part 52 and the master piston 34. The biasing part 58 is preferably a coiled compression spring disposed between the base part 52 and the adjustment part 56 to bias these parts axially away from each other. The indexing biasing element 62 is received in the knob 50 to bias the indexing ring 60 and the knob 50 axially away from each other.

The axial positions of the knob 50 and the adjustment part 56 relative to the push rod 54 are adjustable due to the threaded connections therebetween in order to adjust the free stroke and the rest position of the brake operating member 32 in accordance with the present invention. Specifically, the threaded connection between the knob 50 and the push rod 54 has a higher coefficient of friction than the threaded connection between the adjustment part 56 and the push rod 54. Thus, when the knob 50 is rotated, the push rod 54 will normally rotate with the knob 50. When this occurs, the axial position of the adjustment part 56 relative to the push rod 54 is adjusted to adjust the free stroke of the brake operating member 32. On the other hand, if the knob is prevented from rotating (i.e., held by the rider) and the push rod 54 is rotated relative to the knob 50 and the adjustment part 56, the rest position of the brake operating member 32 is adjusted.

Referring to FIGS. 3-5 and 12-17, the knob 50 includes a user operating portion 50a, indexing element receiving recess 50b, a threaded through bore 50c and projecting portion 50d. The user operating portion 50a has a contoured outer surface that facilitates rotating and preventing rotation of the knob 50 using the rider's fingers. The push rod 54 is threadedly mounted within the threaded through bore 50c. The indexing element receiving recess 50b is an annular recess having splines formed in its outer wall. The indexing biasing element 62 is mounted in the indexing element receiving recess 50b, and then the indexing ring 60 is non-rotatably mounted in the indexing element receiving recess 50b. The knob 50 is preferably constructed of a lightweight rigid material that is well known in the bicycle art such as a rigid plastic or metallic material. The knob 50 is preferably constructed as a one-piece, unitary member using conventional manufacturing techniques such as casting and/or machining.

The indexing ring 60 is biased axially to normally contact the base part 52, even when the projecting portion 50d does not contact the base part 52. The indexing ring 60 has an axially facing indexing surface 60a that cooperates with the base part 52 to prevent inadvertent rotation of the knob 50 relative to the base part 52, and thus, to prevent inadvertent rotation of the push rod due to the relatively high coefficient of friction in the threaded connection between the knob 50 and the push rod 54. Also, the indexing ring 60 provides an index for the position of the knob 50 in eight equal angular increments (i.e., eight forty five degree increments). The indexing ring 60 is preferably constructed of a lightweight rigid material that is well known in the bicycle art such as a rigid plastic or metallic material. The indexing ring 60 is preferably constructed as a one-piece, unitary member using conventional manufacturing techniques such as casting and/or machining.

Referring to FIGS. 3-5 and 18-22, the base part 52 is slidably, non-rotatably received in the recess R. Specifically, the base part 52 includes a pair of side walls 52a and 52b, a contact surface 50c, a recessed surface 50d, an indexing surface 52e, a shaft receiving bore 52f, a guide bore 52g and a transverse coupling bore 52h. The transverse coupling bore 52h extends between the sidewalls 52a and 52b. The side walls 52a and 52b are shaped to cooperate with the coupling portion 32b to be non-rotatable relative thereto. The transverse coupling bore 52h receives an attachment pin 53 to attach the brake operating member 32 thereto. Specifically, the attachment pin 53 is rotatably attached to the coupling portion 32b of the brake operating member 32 to move the base part 52 when the brake operating member 32 is moved. The push rod 54 is slidably received through a hole or slot formed in the attachment pin 53 as seen in FIG. 3.

The contact surface 52c contacts the adjustment part 56 to move the adjustment part 56, the push rod 54 and the master piston 34 after the brake operating member 32 moves through the free stroke. In other words, the space between the contact surface 52c and the adjustment part 56 determines the free stroke of the brake operating member 32. For optimum operation, the adjustment mechanism 36 is preferably adjusted so this space is 0-1.5 millimeters. The recessed surface 52d is configured to contact one end of the biasing part 58. The indexing surface 52e is sized and shaped to cooperate with the axially facing indexing surface 60a of the indexing ring 60, as best understood from FIGS. 12 and 18.

The shaft receiving bore 52f extends between the contact surface 52c and the indexing surface 52e, while the guide bore 52g extends between the recessed surface 52d and the indexing surface 52e. The shaft receiving bore 52f slidably receives the push rod 54 therethrough. The guide bore 52g slidably receives part of the adjustment part 56 therein. The base part 52 is preferably constructed of a lightweight rigid material that is well known in the bicycle art such as a rigid plastic or metallic material. The base part 52 is preferably constructed as a one-piece, unitary member using conventional manufacturing techniques such as casting and/or machining.

Referring to FIGS. 3-8, the push rod 54 includes a shaft 54a and an enlarged ball 54b formed at one end of the shaft 54a. The shaft 54a has a first threaded section 54c, a second threaded section 54d, a first unthreaded section 54e and a second unthreaded section 54f. The adjustment part 56 is threadedly mounted on the second threaded section 54d. The knob 50 is threadedly mounted on the first threaded section 54c. The base part 52 is mounted on the shaft 54a between the adjustment part 56 and the knob 50.

The first threaded section 54c is formed at a free end of the shaft 54a, while the second threaded section 54d is axially spaced from the first threaded section 54c toward the ball 54b with the unthreaded section 54e disposed therebetween. The unthreaded section 54e has a smaller diameter than the second threaded section 54d so that the adjustment part can slide along the unthreaded section 54e. The unthreaded section 54f extends between the second threaded section 54d and the ball 54b, and has a diameter corresponding to the outer diameter of the second threaded section 54d. Thus, the adjustment part 56 can not move beyond the second threaded section 54d toward the ball 54b. In other words, the unthreaded section 54f forms an axial stop preventing further axial movement of the adjustment part 56. A hexagonal bore 54g is formed in the free end of the first threaded section 54c to facilitate engagement with a mating tool such as a hexagonal wrench (i.e., Allen wrench).

The ball 54b is rotatably attached to one end of the master piston 34 such that the push rod 54 is freely rotatable relative to the master piston 34, and non-movable axially relative to the master piston 34. Specifically, the ball 54b is preferably received in a ball socket (not shown) of the master piston 34 by a snap fit or using a two part socket with the two parts fastened together. Such socket joints are generally well known. Accordingly, the socket joint of the master piston 34 that receives the ball 54b therein will not be explained and/or illustrated in further detail herein. The shaft 54a and the ball 54b are preferably constructed of a lightweight rigid material that is well known in the bicycle art such as a rigid plastic or metallic material. The shaft 54a and the ball 54b are preferably integrally formed together as a one-piece, unitary member using conventional manufacturing techniques such as casting and/or machining.

Referring to FIGS. 3-5 and 9-11, the adjustment part 56 includes an adjustment plate 56a and a guide protrusion 56b extending from the adjustment plate 56a. The adjustment plate 56a has a threaded bore 56c threadedly mounted on the second threaded section 54d of the push rod 54. The guide protrusion 56b supports the biasing part 58 and is partially received in the guide bore 52g of the base part 52 such that the adjustment part 56 is non-rotatable relative to the base part 52. Thus, the biasing part 58 biases the base part 52 axially away from the adjustment part 56. As mentioned above, the base part 52 is non-rotatable relative to the brake operating member 32 and the housing 30 due to its connection to the brake operating member 32 and the connection between the brake operating member 32 and the housing 30. Thus, rotation of the shaft 54a causes the adjustment plate 56 to move axially along the shaft 54a.

In the illustrated embodiment, the knob 50, the indexing ring 60, the indexing biasing element 62 and the push rod 54 form parts of a first adjustment member that is rotated in order to adjust the length of the free stroke in accordance with the present invention. The push rod 54 also constitutes part of a second adjustment member that is rotated about a longitudinal rod axis Y to adjust the rest position of the brake operating lever 32. The rod axis Y is substantially coincident with the longitudinal axis of the master piston 34.

More specifically, the friction between the knob 50 and the shaft 54a is larger than the friction between the adjustment part 56 and the shaft 54a. Thus, when the knob 50 is rotated, the shaft 54a rotates with the knob 50 so that the adjustment plate 56 moves axially on the shaft 54a to adjust the space between the contact surface 52c of the base part 52 and the adjustment plate 56a of the adjustment part 56 in order to adjust the free stroke. The rest position of the brake operating member 32 will not change during such adjustment because the knob 50 does not move axially relative to the shaft 54a, and thus, the position of the base part 52 coupled to the brake operating member 32 does not change. On the other hand, if the knob 50 is prevented from rotating (by the rider holding it) and the shaft 54a is rotated using a tool received in the hexagonal bore 54g, both the knob 50 and the adjustment part 56 will move axially to adjust the rest position. When this adjustment is made, the free stroke will not change because the relative positions of the knob 50 and adjustment part 56 will not change, and thus, the space between the contact surface 52c of the base part 52 and the adjustment plate 56a of the adjustment part 56 will not change. Depending on the rotation directions of the knob 50 and/or shaft 54a, opposite adjustments of the free stroke and rest position can be obtained.

Figure 24:
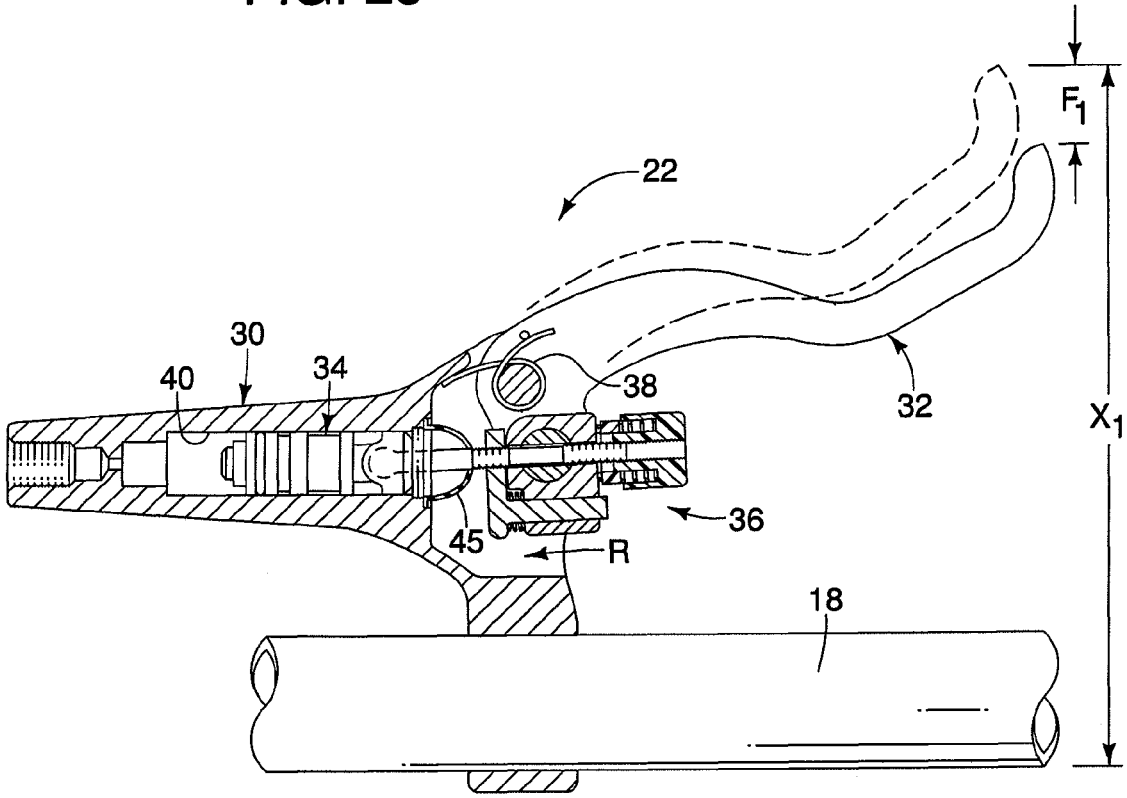
FIG. 24 is a top plan view of the hydraulic brake device illustrated in FIG. 23, with the brake operating member moved to a first intermediate position from the first rest position after moving the brake operating member through the first free stroke set by the adjustment mechanism and with the master piston remaining in the initial travel position.
Figure 25:
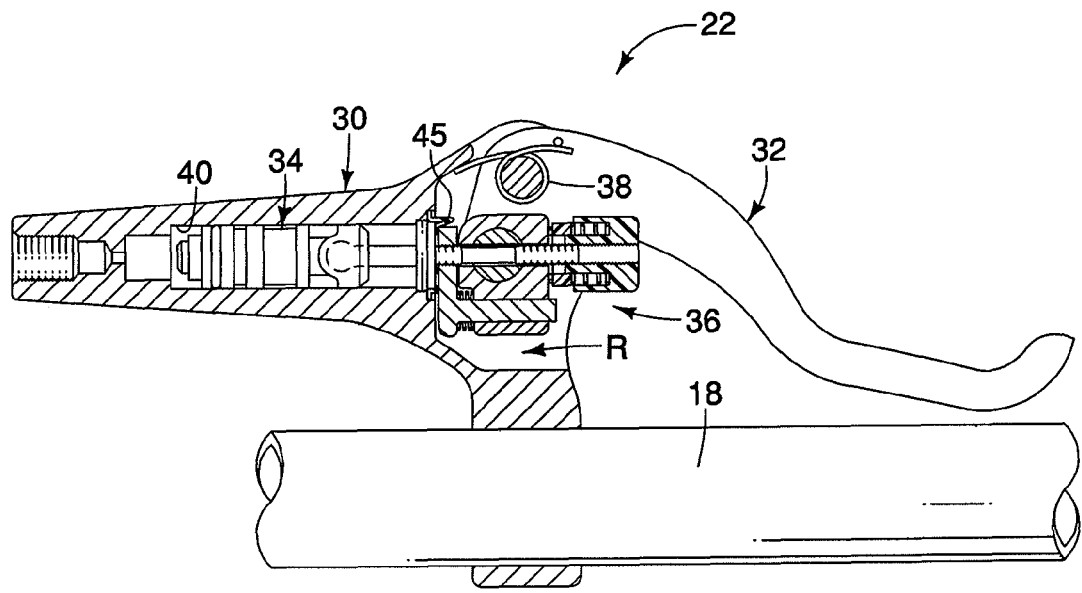
FIG. 25 is a top plan view of the hydraulic brake device illustrated in FIGS. 23 and 24, with the brake operating member moved to the brake actuating position from the first intermediate position and with the master piston moved from the initial travel position to a braking travel position during movement of the brake operating member from the first intermediate position to the brake actuating position.
Figure 26:
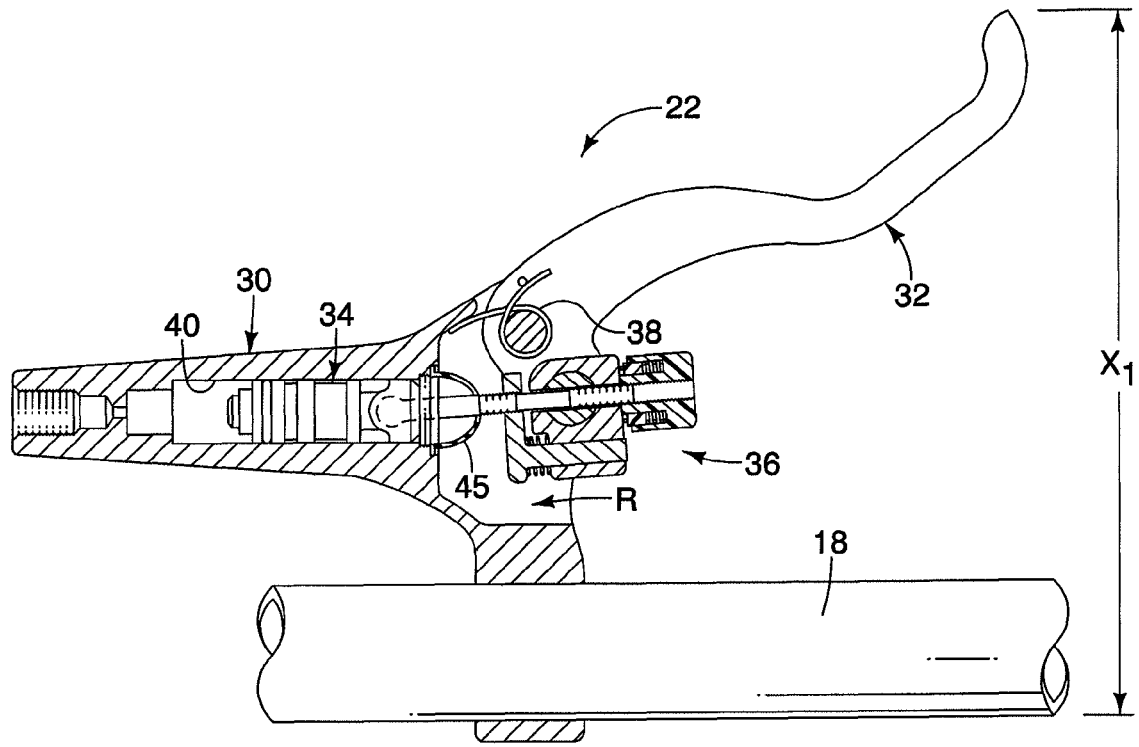
FIG. 26 is a top plan view of the hydraulic brake (actuation) device illustrated in FIGS. 1-3, with portions broken away for the purpose of illustration, with the brake operating member in a first (maximum) rest position set by the adjustment mechanism, with the master piston in an initial travel position and with the adjustment mechanism set to allow a second (middle) free stroke smaller than the first free stroke.
Figure 27:
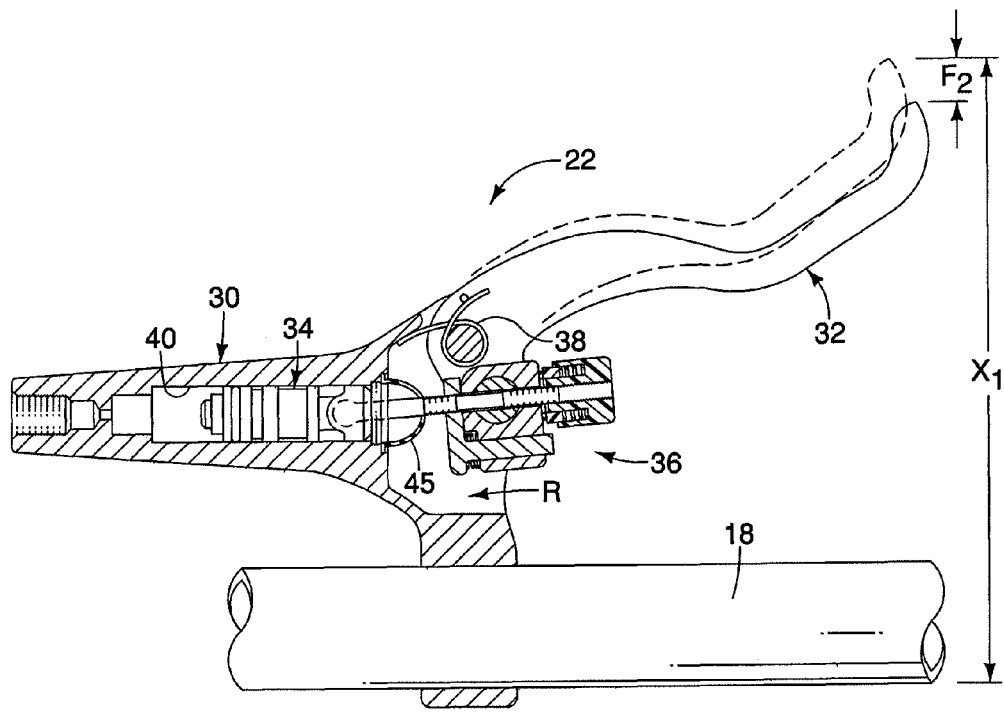
FIG. 27 is a top plan view of the hydraulic brake device illustrated in FIG. 26, with the brake operating member moved to a second intermediate position from the first rest position after moving the brake operating member through the second free stroke set by the adjustment mechanism and with the master piston remaining in the initial travel position.
Figure 28:
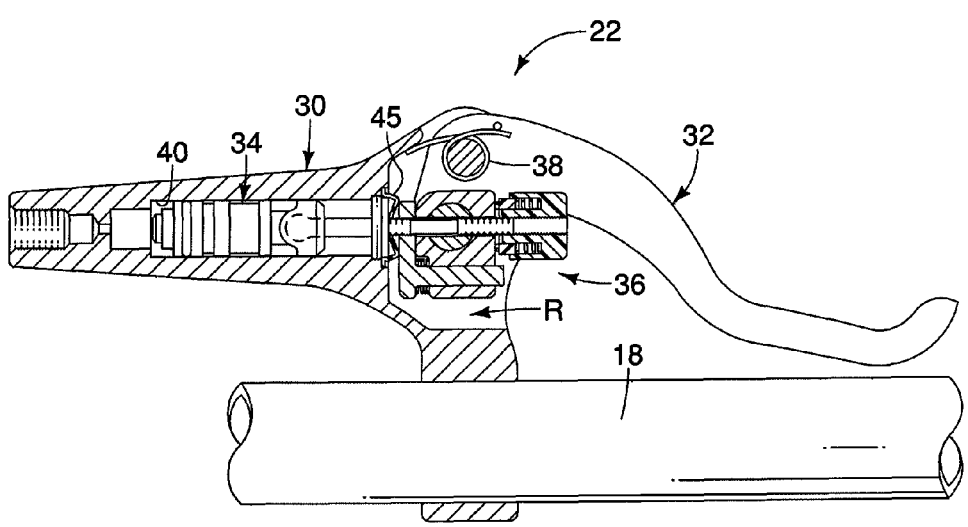
FIG. 28 is a top plan view of the hydraulic brake device illustrated in FIGS. 26 and 27, with the brake operating member moved to the brake actuating position from the second intermediate position and with the master piston moved from the initial travel position to a braking travel position during movement of the brake operating member from the second intermediate position to the brake actuating position.
Figure 29:
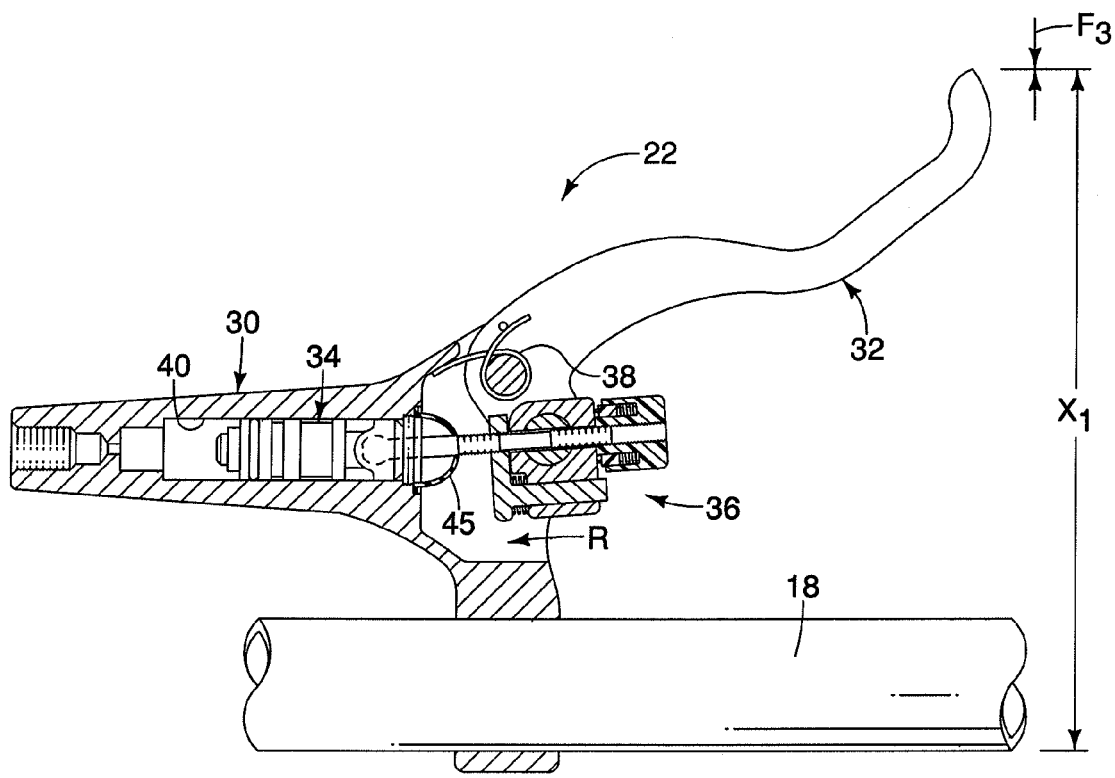
FIG. 29 is a top plan view of the hydraulic brake (actuation) device illustrated in FIGS. 1-3, with portions broken away for the purpose of illustration, with the brake operating member in a first (maximum) rest position set by the adjustment mechanism, with the master piston in an initial travel position and with the adjustment mechanism set to allow a zero (minimum) free stroke.
Figure 31:
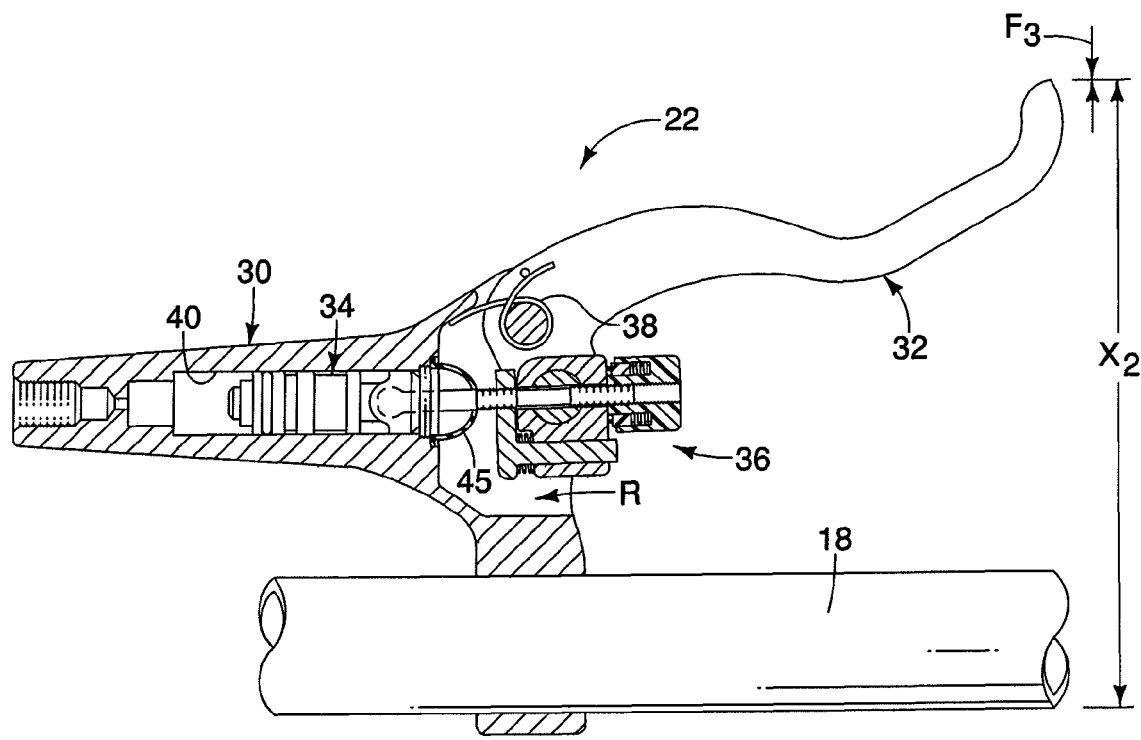
FIG. 31 is a top plan view of the hydraulic brake (actuation) device illustrated in FIGS. 1-3, with portions broken away for the purpose of illustration, with the brake operating member in a second (middle) rest position set by the adjustment mechanism closer to the handlebar than the first rest position, with the master piston in an initial travel position and with the adjustment mechanism set to allow a zero (minimum) free stroke.
Figure 32:
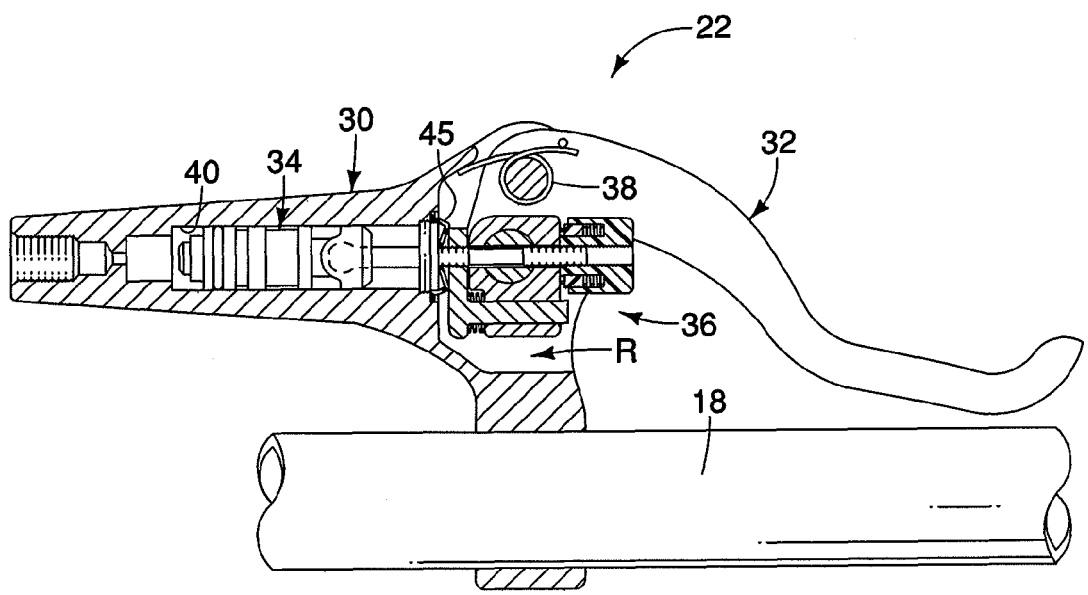
FIG. 32 is a top plan view of the hydraulic brake device illustrated in FIG. 31, with the brake operating member moved to the brake actuating position from the second rest position (with no free stroke) and with the master piston moved from the initial travel position to a braking travel position during movement of the brake operating member from the second rest position to the brake actuating position.
Figure 33:
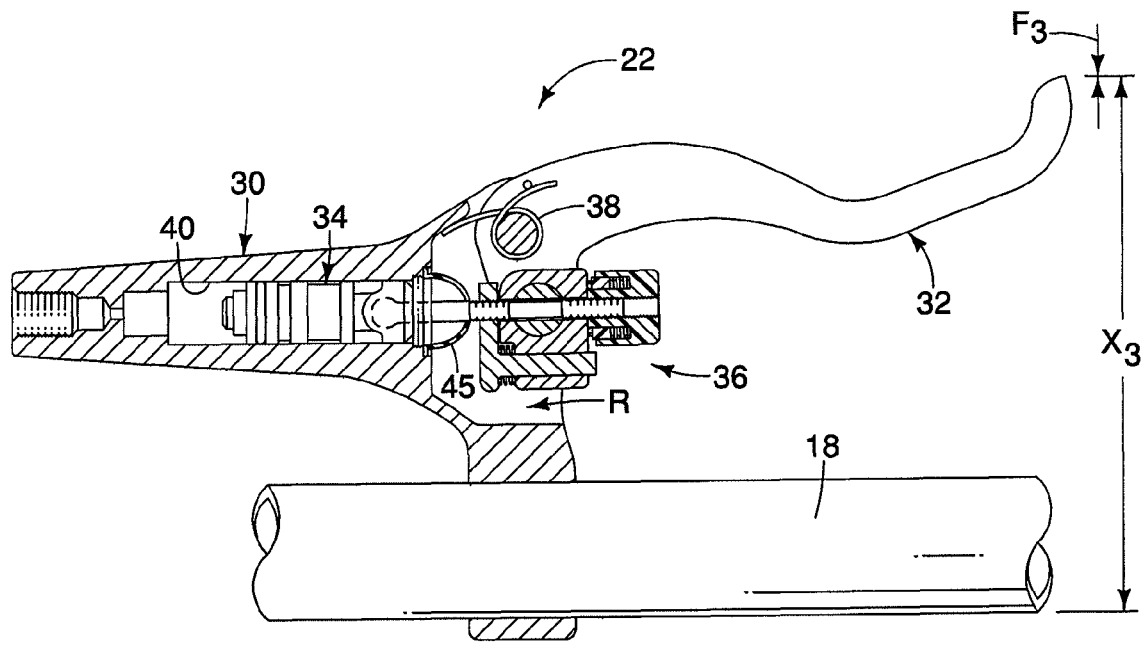
FIG. 33 is a top plan view of the hydraulic brake (actuation) device illustrated in FIGS. 1-3, with portions broken away for the purpose of illustration, with the brake operating member in a third (minimum) rest position set by the adjustment mechanism closer to the handlebar than the second rest position, with the master piston in an initial travel position and with the adjustment mechanism set to allow a zero (minimum) free stroke.

The free stroke of the brake operating member 32 is preferably adjustable between a first predetermined (maximum) length of free stroke $F_1$ that is about 10 millimeters as measured along the braking plane Q as seen in FIG. 24 and a third (minimum) free stroke $F_3$ (no free stroke) as shown in FIGS. 29, 31 and 33, regardless of the rest position of the brake operating member 32. A second (middle) free stroke $F_2$ is preferably about 7 millimeters as measured along the braking plane Q as seen in FIG. 27. This is an optimal range of free strokes, even though it is possible to provide a larger range of free strokes with the structure illustrated herein.

The rest position of the brake operating member 32 is preferably adjustable between a first (maximum) position (space $X_1$ that is about 116 millimeters as measured along the braking plane Q) shown in FIGS. 23, 24, 26, 27 and 29 and a third (minimum) position (space $X_3$ that is about 88 millimeters) shown in FIG. 33, regardless of the free stroke of the brake operating member 32. A second (middle) position (space $X_2$ is preferably about 92 millimeters as measured along the braking plane Q) is shown in FIG. 27. This is an optimal range of rest positions, even though it is possible to provide a larger range of rest positions with the structure illustrated herein.

Figure 30:
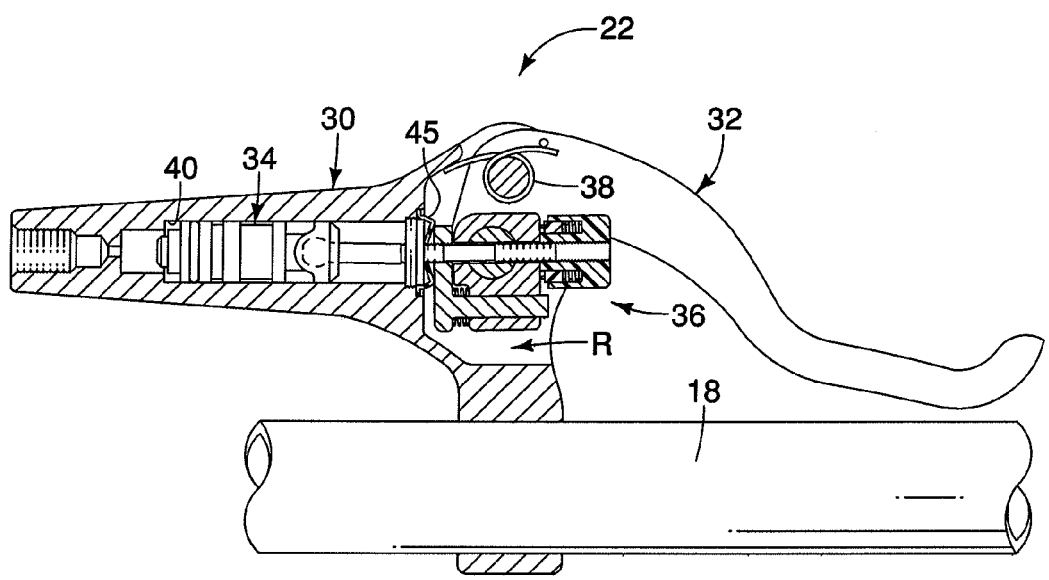
FIG. 30 is a top plan view of the hydraulic brake device illustrated in FIG. 29, with the brake operating member moved to the brake actuating position from the first rest position (with no free stroke) and with the master piston moved from the initial travel position to a braking travel position during movement of the brake operating member from the first rest position to the brake actuating position.
Figure 34:
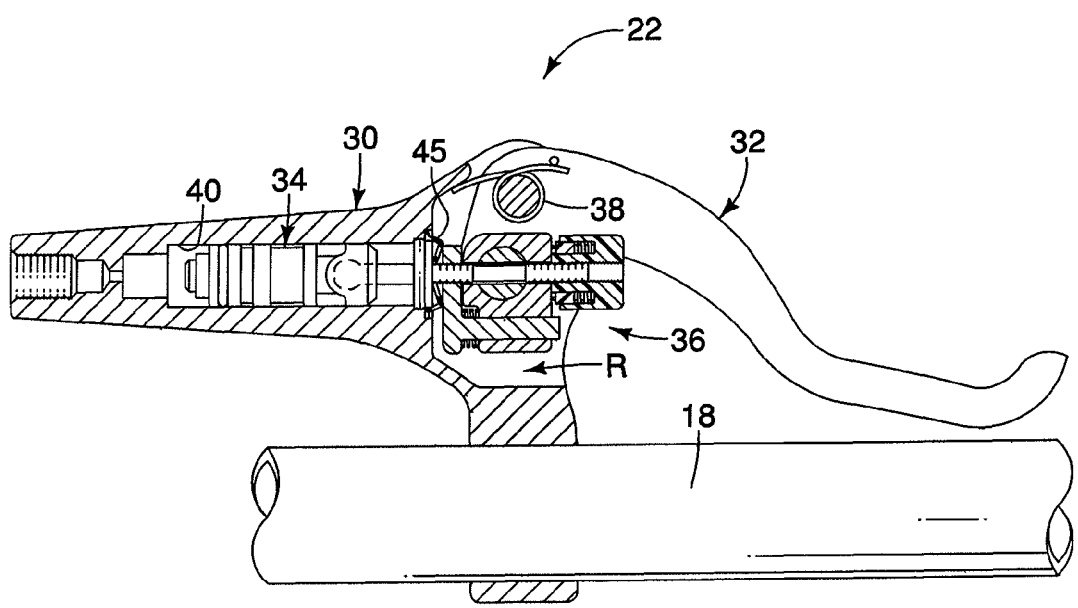
FIG. 34 is a top plan view of the hydraulic brake device illustrated in FIG. 33, with the brake operating member moved to the brake actuating position from the third rest position (with no free stroke) and with the master piston moved from the initial travel position to a braking travel position during movement of the brake operating member from the third rest position to the brake actuating position.

Due to the arrangement described and illustrated herein, a relatively wide range of piston travel can be provided, yet the initial travel position of the master piston 34 can remain unchanged (fixed) during adjustment of the free stroke and/or rest position of the brake operating member 32. A maximum master piston travel can be achieved with the first rest position and no free stroke (FIGS. 29-30). A minimum master piston travel can be achieved with the third rest position (FIGS. 33-34) and a maximum free stroke (only shown in FIGS. 23-24). In other words, the adjustment mechanism 36 can be adjusted to provide up to the maximum free stroke, even when the rest position is in the middle or the third rest position (i.e., the free stroke can be increased with the rest positions shown in FIGS. 31-34) by rotating the knob 50 and shaft 54a together.

The free strokes $F_1$, $F_2$ and $F_3$ are measured in a direction parallel to the braking plane and perpendicular to a center axis C of the curved mounting surface of the tubular clamping portion 44. The axis C is coincident with the center axis of the handlebar 18 when the hydraulic brake device 22 is attached thereto. Similarly, the spaces $X_1$, $X_2$ and $X_3$ are measured in a direction parallel to the braking plane and perpendicular to a center axis C. However, it will be apparent to those skilled in the art from this disclosure that the various free strokes and various rest positions can be determined by measuring angularly about the pivot axis A.

GENERAL INTERPRETATION OF TERMS

In understanding the scope of the present invention, the term "comprising" and its derivatives, as used herein, are intended to be open ended terms that specify the presence of the stated features, elements, components, groups and/or steps, but do not exclude the presence of other unstated features, elements, components, groups and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle hydraulic brake device comprising:
a housing having a master cylinder;
a master piston movably mounted in the master cylinder;
a brake operating member movably coupled relative to the housing to move between a rest position and a brake actuating position and to move the master piston in the master cylinder in response to movement of the brake operating member to the brake actuating position; and
an adjustment mechanism operatively coupled between the brake operating member and the master piston to adjust the rest position and a free stroke of the brake operating member with an initial travel position of the master piston remaining unchanged,
the adjustment mechanism including a first adjustment member that adjusts a length of the free stroke and a second adjustment member that adjusts the rest position of the brake operating member without changing the length of the free stroke,
the first adjustment member including a knob that is rotated to adjust the length of the free stroke,
the second adjustment member including a shaft that is rotated about a longitudinal axis to adjust the rest position of the brake operating member, and
the knob being coaxially supported at a free end of the shaft.

2. The bicycle hydraulic brake device according to claim 1, wherein
the shaft is coupled to the master piston such that the shaft is freely rotatable relative to the master piston and axially non-movable relative to the master piston.

3. The bicycle hydraulic brake device according to claim 2, wherein
the knob and the shaft are arranged to rotate together when the knob is rotated to adjust the length of the free stroke, and arranged such that the shaft is rotated relative to the knob to adjust the rest position.

4. A bicycle hydraulic brake device comprising:
a housing having a master cylinder;
a master piston movably mounted in the master cylinder;
a brake operating member movably coupled relative to the housing to move between a rest position and a brake actuating position and to move the master piston in the master cylinder in response to movement of the brake operating member to the brake actuating position; and
an adjustment mechanism operatively coupled between the brake operating member and the master piston to adjust the rest position and a free stroke of the brake operating member with an initial travel position of the master piston remaining unchanged,
the adjustment mechanism including a first adjustment member that adjusts a length of the free stroke and a second adjustment member that adjusts the rest position of the brake operating member without changing the length of the free stroke, with the first and second adjustment members being coaxially disposed on a common rotational axis to adjust the rest position and the free stroke respectively,
the first adjustment member including a knob that is rotated to adjust the length of the free stroke,
the second adjustment member including a shaft that is rotated about a longitudinal axis to adjust the rest position of the brake operating member,
the knob and the shaft being arranged to rotate together when the knob is rotated to adjust the length of the free stroke, and arranged such that the shaft is rotated relative to the knob to adjust the rest position, and
the adjustment mechanism including an adjustment part that is threadedly mounted on the shaft to move axially relative to the shaft in response to rotation of the shaft relative to the adjustment part, and the knob being threadedly attached to the shaft to move axially in response to rotation of the shaft relative to the knob such that the rest position is adjusted when the shaft is rotated relative to the knob.

5. The bicycle hydraulic brake device according to claim 4, wherein
the brake operating member is biased toward the rest position from the braking position by a biasing member.

6. The bicycle hydraulic brake device according to claim 4, wherein the brake operating member is pivotally attached to the housing to move about a pivot axis.

7. The bicycle hydraulic brake device according to claim 6, wherein
the brake operating member is biased toward the rest position from the braking position by a biasing member.

8. The bicycle hydraulic brake device according to claim 4, wherein
the shaft is coupled to the master piston such that the shaft is freely rotatable relative to the master piston and axially non-movable relative to the master piston.

9. The bicycle hydraulic brake device according to claim 4, wherein
the adjustment mechanism includes a base part that is coupled to the brake operating member to move axially in response to movement of the brake operating member, the base part being disposed between the knob and the adjustment part such that relative axial positions of the base part and the adjustment part are adjustable in order to adjust the length of the free stroke when the knob and shaft are rotated together.

10. The bicycle hydraulic brake device according to claim 9, wherein
the adjustment mechanism includes a biasing part disposed between the base part and the adjustment part to bias the base part away from the adjustment part.

11. The bicycle hydraulic brake device according to claim 9, wherein
the base part has a contact surface that contacts the adjustment part after the free stroke.

12. The bicycle hydraulic brake device according to claim 9, wherein
a space between the contact surface and the adjustment part is adjustable between zero millimeters and 1.5 millimeters such that the length of the free stroke of the brake operating member is adjustable between a zero free stroke and a predetermined amount of free stroke.

13. The bicycle hydraulic brake device according to claim 4, wherein
the knob and the shaft of the first and second adjustment members are arranged and configured such that the free stroke and the rest position of the brake operating member are adjustable without detaching the brake operating member from the adjusting mechanism.

14. The bicycle hydraulic brake device according to claim 4, wherein
the length of the free stroke adjustment is adjustable between a zero free stroke and a predetermined amount of free stroke.

15. The bicycle hydraulic brake device according to claim 4, wherein
the second adjustment member is coupled to the master piston.

16. The bicycle hydraulic brake device according to claim 4, wherein
the housing includes a mounting portion having a curved surface extending around a center mounting axis, and the master piston moves along a longitudinal piston axis parallel to the center mounting axis.

17. The bicycle hydraulic brake device according to claim 4, wherein
the master cylinder is absent a biasing member.

18. The bicycle hydraulic brake device according to claim 4, wherein
the first and second adjustment members are directly threadedly coupled to each other.

19. The bicycle hydraulic brake device according to claim 4, wherein
a free end of the second adjustment member is partially disposed inside the first adjustment member.

20. A bicycle hydraulic brake device comprising:
a housing having a master cylinder;
a master piston movably mounted in the master cylinder;
a brake operating member movably coupled relative to the housing to move between a rest position and a brake actuating position and to move the master piston in the master cylinder in response to movement of the brake operating member to the brake actuating position; and
an adjustment mechanism operatively coupled between the brake operating member and the master piston to adjust the rest position and a free stroke of the brake operating member with an initial travel position of the master piston remaining unchanged,
the adjustment mechanism including a first adjustment member that adjusts a length of the free stroke and a second adjustment member that adjusts the rest position of the brake operating member without changing the length of the free stroke,
the first adjustment member having a first part and the second adjustment member having a second part that are arranged to move together to adjust the length of the free stroke and arranged to move separately to adjust the rest position,
the adjustment mechanism including an adjustment part that is adjustably mounted relative to the first and second adjustment members and a base part that is coupled to the brake operating member, the base part being arranged and configured to engage the adjustment part after the free stroke.

21. The bicycle hydraulic brake device according to claim 20, wherein
the first part is adjustably mounted to the second part.

22. The bicycle hydraulic brake device according to claim 20, wherein
the adjustment mechanism includes a biasing element disposed between the base part and the adjustment part to bias the base part away from the adjustment part.

23. The bicycle hydraulic brake device according to claim 20, wherein
the base part has a contact surface that contacts the adjustment part after the free stroke.

24. The bicycle hydraulic brake device according to claim 23, wherein
a space between the contact surface and the adjustment part is adjustable between zero millimeters and 1.5 millimeters such that the length of the free stroke of the brake operating member is adjustable between a zero free stroke and a predetermined amount of free stroke.

* * * * *